United States Patent [19]
Kolar, Jr.

[11] Patent Number: 5,522,636
[45] Date of Patent: Jun. 4, 1996

[54] METHOD AND APPARATUS FOR ADJUSTABLY POSITIONING WINDOW ASSEMBLIES IN AUTOMOTIVE VEHICLES

[75] Inventor: Theodore V. Kolar, Jr., Chesterfield Twp., Mich.

[73] Assignee: Ford Motor Company, Dearborn, Mich.

[21] Appl. No.: 318,314

[22] Filed: Oct. 5, 1994

[51] Int. Cl.⁶ ........................................................ B60J 1/00
[52] U.S. Cl. .................... 296/146.15; 296/96.21; 296/201; 52/204.597; 52/208
[58] Field of Search ................ 296/84.1, 96.21, 296/146.15, 201; 49/465, 466; 52/204.62, 208, 204.591, 204.597, DIG. 13

[56] References Cited

U.S. PATENT DOCUMENTS

| | | | |
|---|---|---|---|
| 3,668,808 | 6/1972 | Perina | 49/465 |
| 3,745,709 | 7/1973 | Perina | 49/465 |
| 4,271,566 | 6/1981 | Perina | 49/465 X |
| 4,396,223 | 8/1983 | Drexel et al. | 296/201 |
| 4,553,309 | 11/1985 | Hess et al. | |
| 4,606,159 | 8/1986 | Kunert | |
| 4,758,039 | 7/1988 | Ohhazama et al. | 296/96.21 |
| 4,762,358 | 8/1988 | Levosky et al. | |
| 4,792,175 | 12/1988 | Gerber | |
| 4,938,521 | 7/1990 | Kunert | |
| 4,940,009 | 7/1990 | Keithley, Jr. | |
| 5,413,397 | 5/1995 | Gold | 296/146.15 |

FOREIGN PATENT DOCUMENTS

| | | | |
|---|---|---|---|
| 3018213 | 11/1981 | Germany | 296/201 |

*Primary Examiner*—Dean Kramer
*Attorney, Agent, or Firm*—Daniel M. Stock; Roger L. May

[57] ABSTRACT

An improved window assembly 36 is provided, in which an adjustable mounting strip assembly 40, formed as a molded, interlocking fastener having first and second planar strips 42, 46, is adhesively secured to a windshield 14 and a portion of the vehicle body 12 to permit relative movement between the window 14 and the body 12 during curing of an adhesive 48. A method of using the mounting strip assembly 40 is disclosed in which light beam sources 16, 18 provide data to a processor 20 through which position of the windshield 14 with respect to the body is sensed so that the relative movement permitted by the mounting strip 40 can be effected.

20 Claims, 2 Drawing Sheets

5,522,636

METHOD AND APPARATUS FOR ADJUSTABLY POSITIONING WINDOW ASSEMBLIES IN AUTOMOTIVE VEHICLES

BACKGROUND OF THE INVENTION

1. Technical Field

The present invention relates generally to automotive window assemblies, and more specifically to processes and mechanisms for adjustably positioning such window assemblies to assemble a nonmovable window, that is, a fixed window, to the body of an automotive vehicle through adhesive securement.

2. Description of the Prior Art

In many such assemblies, a flange is provided around the periphery of an aperture formed through sheet metal or plastic panels which form the body. A bead of adhesive is introduced at the peripheral flange to contact the outer peripheral edges of the window pane, and, upon curing the adhesive, the window is fixed in place. Since large automotive windows, such as windshields and backlites, are relatively massive structures, the appropriate configuration of tile hardened bead adhesive must be maintained by additional componentry. U.S. Pat. No. 4,938,521 is exemplary of spacers provided to maintain the perpendicular distance between the pane of glass and adjacent flange of the automotive body.

Other mechanical stop mechanisms have often been employed to arrest the lateral movement of fixed windows, particularly in the vertical direction. One example of such a mechanical stop mechanism is shown at FIG. 2 in the drawings.

Because of the increased interest of consumers in the fits and finishes of modern automotive vehicles, it is considered desirable to provide for fine adjustments of the position of the window with respect to the vehicle body during the assembly of the vehicle. The prior art stop mechanisms suffer from the disadvantage that they hold the window in fixed position during the curing of the adhesive, but do not lend themselves to adjustable movement of the fixed window.

SUMMARY OF THE INVENTION

This disadvantage is overcome in the fixed window assembly of the present invention by providing for a body aperture, in which a quantity of adhesive is disposed between the window and aperture, having a mounting strip assembly that is adhesively secured to both the window and the adjacent body structure, which includes a unitary structure for fixedly securing the window pane to the body and for permitting selective movement between the window pane and the body during the period when the adhesive is curing.

The fixed window assembly of the present invention thus provides the support function of the prior art while adding the adjustability function, and it accomplishes this without undesirable expenditure of materials such as the mechanical fasteners utilized in the prior art.

The invention fixed window assembly also permits utilization of a new method of positioning a window pane in an automotive vehicle body that provides for adhesively securing mounting strips to each of the window pane and the vehicle body, applying an adhesive between the window pane and the body, and releasably interlocking the mounting strips. The invention method also provides that adjustable movement between the window pane and the body may be effected during curing of the adhesive in response to measurements of the position of the window with respect to the body in relationship to a desired position.

BRIEF DESCRIPTION OF THE DRAWINGS

The foregoing and other advantages in the apparatus of the fixed window assembly of the present invention, and in the method for assembling the window to an automotive vehicle body, may occur to those skilled in the automotive body arts upon reading the following description of exemplary embodiments with reference to the accompanying drawings, in which.

DESCRIPTION OF THE PREFERRED EMBODIMENTS

Figure 1:
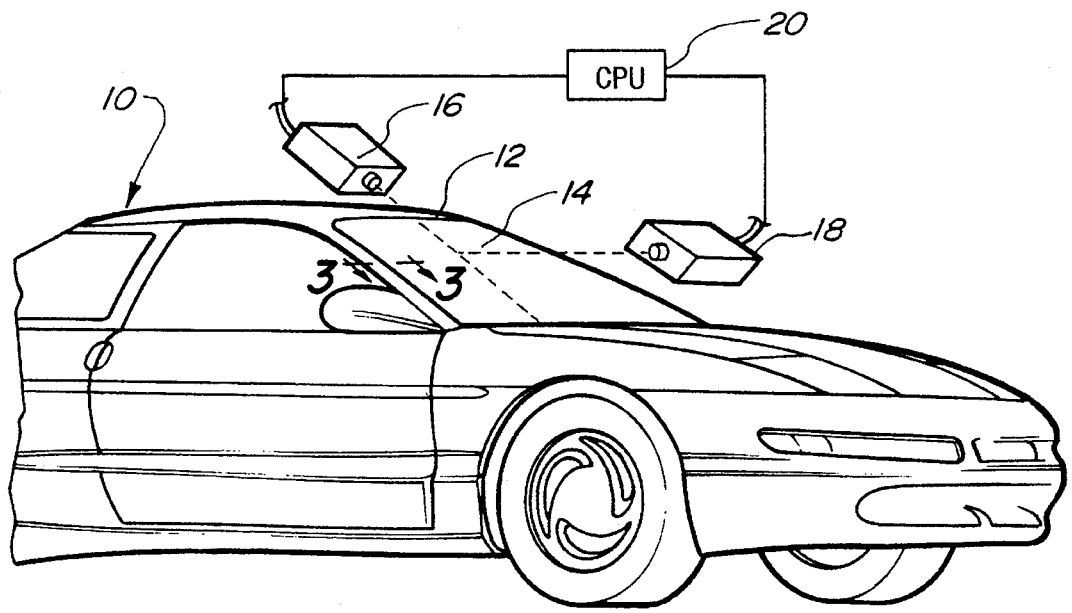
FIG. 1 is a perspective view of an automotive vehicle showing final assembly of its windshield.

Turning now to the drawings, in particular to FIG. 1 thereof, an automobile 10 is illustrated as including a body 12 into which is assembled a windshield 14. During the assembly of such a vehicle, it is desirable that the position of the windshield 14, with respect to the vehicle body 12, be accurately and repeatedly set. To ensure such positioning, quality control mechanisms, such as indicated diagrammatically by light beam sources 16, 18, which may in fact be laser mechanisms, are positioned in a known manner with respect to the body 12 and define desired points or planes for positioning the windshield 14. Positions on the face of the windshield, sensed by the light beam sources 16, 18, are transmitted to a processing unit 20, which compares the positions to a desired position in a known manner and provides manufacturing workers with an indication of the relative position of the windshield 14 with respect to the desired position. The adjustability provided by the glass stops of the present invention permit appropriate response to such indications.

Figure 2:
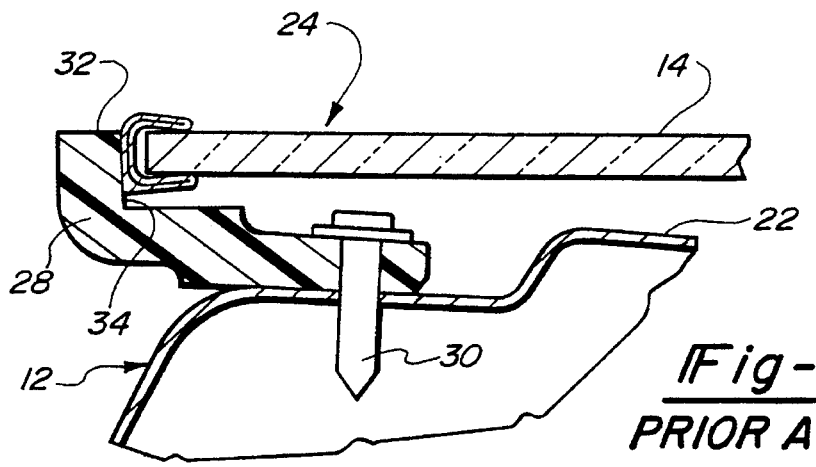
FIG. 2 is a cross-sectional view of the mechanically fastened fixed glass stop of the type previously used in vehicles of the type shown in FIG. 1.

Turning next to FIG. 2, the windshield 14 is illustrated as being positioned with respect to portions 22 of the vehicle body 12 which are in juxtaposition with the peripheral edge portions 24 of the windshield 14. A molding 26 is carried on the outer edge of the windshield 14 and abuttingly engages a generally L-shaped stop 28 which is fixedly secured, as by a pin 30, to the body 12. If lateral adjusting movement of the windshield 14 with respect to the body 12 is attempted, it can be effected only rightwardly, as viewed in FIG. 2. When the outer surface 32 of the molding 26 separates from the inner surface 34 of the fixed stop 28, the stop 28 is ineffective to position the glass and other mechanisms must be provided. Other prior art devices function similarly.

Figure 3:
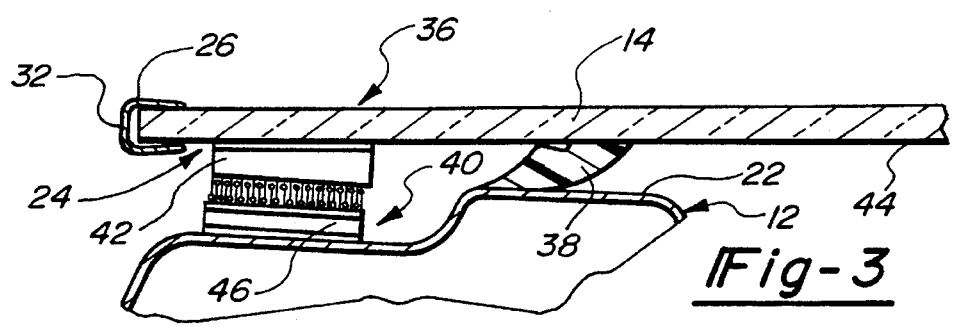
FIG. 3 is a cross-sectional view taken along line 3—3 of FIG. 1.
Figure 4:
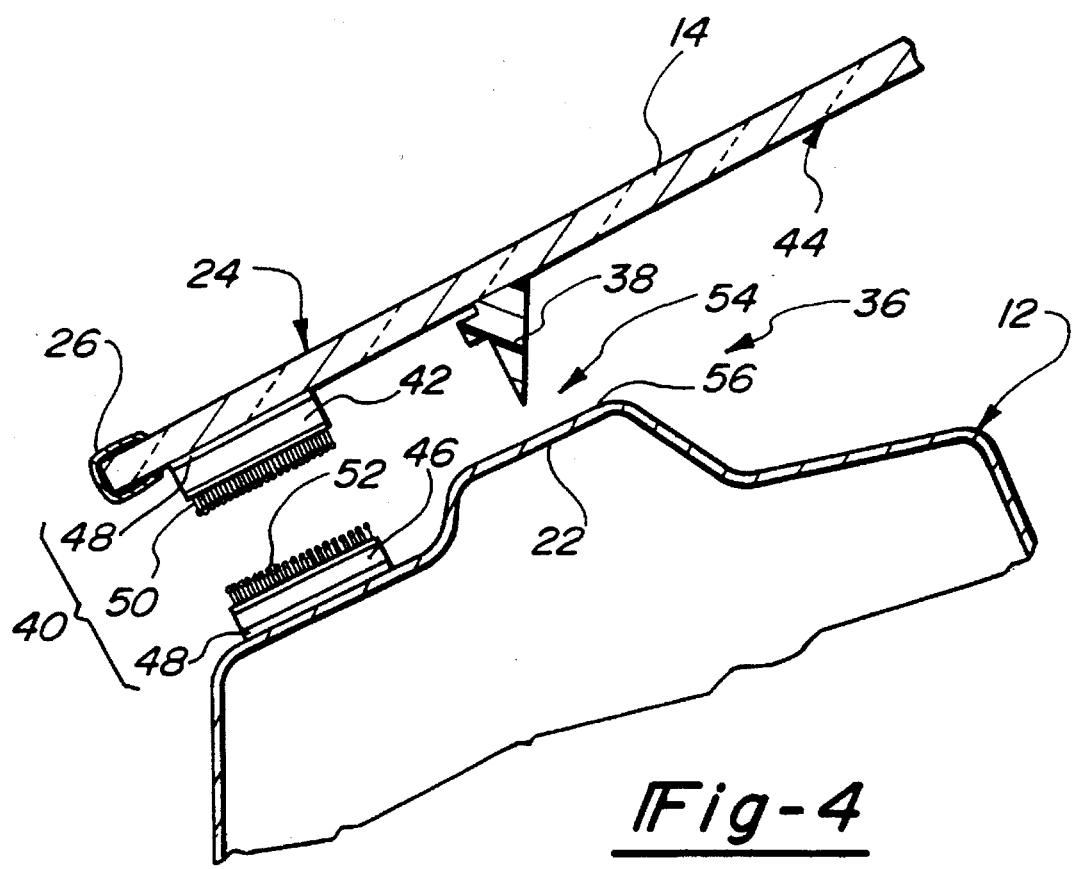
FIG. 4 is an exploded cross-sectional view of the window assembly of FIG. 3 with its mounting strip assembly disengaged position.

Turning next to FIGS. 3 and 4, a fixed window assembly 36, according to the present invention, is shown, which includes the windshield 14 having outer peripheral edge portions 24 in juxtaposition with portions 22 of the vehicle body 12 and having a bead 38 of adhesive, preferably a urethane adhesive, operatively carried between the body 12 and the windshield 14, and a mounting strip assembly 40, preferably positioned laterally outwardly from the bead 38. The mounting strip assembly 40, as may best be seen in FIG. 4, is preferably a molded, interlocking fastener such as the Dual Lock®fastener manufactured by the 3M Company. Other such fasteners, such as hook-and-loop fasteners of the type referred to as "Velcro" fasteners, may also be chosen. According to the illustrated embodiment, one-half of the fastener comprises a first planar strip 42 adhesively secured to the inner face 44 of the windshield 14, and the other half of the fastener comprises a second planar strip 46 adhesively secured to an outward facing surface 48 of the body 12. Each of the planar strips 42, 46 has a plurality of locking projections 50, 52, respectively, projecting perpendicularly therefrom to effect releasable locking engagement therebetween in the well-known manner of molded interlocking fasteners.

In using the window assembly 36, according to the present invention, the adhesive bead 38 is positioned in a space 54 between the windshield 14 and the body 12. In the illustrated embodiment, bead 38 is shown as having been applied to the inner surface 44 of the windshield 14. However, in some applications, it may be appropriate to apply it to an outer surface such as that indicated at 56 of the body 12. The windshield 14 is moved, preferably by a robot, into a position in which the strips 42, 46, which had previously been adhesively secured as shown in FIG. 4, are in facing relationship. The windshield 14 is then presented generally perpendicularly toward the body 12 to assume the position shown in FIG. 3, in which the strips 42 and 46 are engaged and the bead 38 is compressed. If the processor 20 does not indicate a mispositioning of the windshield 14 with respect to the body 12, the strips 42, 46 function to maintain the position of the windshield 14 with respect to the body 12 while the adhesive bead 38 cures in place. If, however, mispositioning is sensed, the windshield may be pulled generally perpendicularly away from the body to disengage the strips 42, 46 and allow repositioning in a new location with subsequent curing. Advantageously, this is effected without the requirement to remove any fasteners or otherwise reposition fixed stops.

While only certain embodiments of the present invention have been described or referred to herein, others may occur to those skilled in the automotive body arts which do not depart from the scope of the following claims.

I claim:

1. A fixed window assembly for an automotive vehicle body, comprising:

a window pane defining generally planar peripheral edge portions;

a quantity of adhesive operatively disposed between said window pane edge portions and portions of said vehicle in juxtaposition with said window pane edge portions, said adhesive having a cured state in which movement of said window pane with respect to said vehicle body is prevented and an uncured state in which said movement is permitted; and a mounting strip assembly adhesively secured to both of said window pane edge portions and said vehicle body portions, and including unitary means for fixedly securing said window pane to said body and for permitting selective movement therebetween when said adhesive is in said uncured state.

2. A fixed window assembly as defined in claim 1, wherein said mounting strip assembly comprises a molded, interlocking fastener.

3. A fixed window assembly as defined in claim 2, wherein said mounting strip assembly comprises:

a first planar strip adhesively secured to said window pane edge portions and having a first set of locking projections projecting perpendicularly therefrom; and a second planar strip adhesively secured to said vehicle body portions and having a second set of locking projections projecting perpendicularly therefrom to releasably lockingly engage said first set of locking projections.

4. A fixed window assembly as defined in claim 2, wherein said quantity of adhesive is positioned laterally inwardly from said window pane edge portions.

5. A fixed window assembly as defined in claim 2, wherein said adhesive is a urethane adhesive.

6. A fixed window assembly as defined in claim 1, wherein said mounting strip assembly comprises:

a first planar strip adhesively secured to said window pane edge portions and having a first set of locking projections projecting perpendicularly therefrom; and a second planar strip adhesively secured to said vehicle body portions and having a second set of locking projections projecting perpendicularly therefrom to releasably lockingly engage said first set of locking projections.

7. A fixed window assembly as defined in claim 6, wherein said quantity of adhesive is positioned laterally inwardly from said window pane edge portions.

8. A fixed window assembly as defined in claim 6, wherein said adhesive is a urethane adhesive.

9. A fixed window assembly as defined in claim 1, wherein said quantity of adhesive is positioned laterally inwardly from said window pane edge portions.

10. A fixed window assembly as defined in claim 1, wherein said adhesive is a urethane adhesive.

11. A fixed window assembly for an automotive vehicle body, comprising:

a window pane defining generally planar peripheral edge portions;

a quantity of adhesive operatively disposed between said window pane edge portions and portions of said vehicle in juxtaposition with said window pane edge portions, said adhesive having a cured state in which movement of said window pane with respect to said vehicle body is prevented and an uncured state in which said movement is permitted; and a molded, interlocking fastener adhesively secured to both said window pane edge portions and said vehicle body portions.

12. A fixed window assembly as defined in claim 11, wherein said molded, interlocking fastener assembly comprises:

a first planar strip adhesively secured to said window pane edge portions and having a first set of locking projections projecting perpendicularly therefrom; and a second planar strip adhesively secured to said vehicle body portions and having a second set of locking projections projecting perpendicularly therefrom to releasably lockingly engage said first set of locking projections.

13. A fixed window assembly as defined in claim 12, wherein said adhesive is a urethane adhesive.

14. A fixed window assembly as defined in claim 11, wherein said quantity of adhesive is positioned laterally inwardly from said window pane edge portions.

15. A fixed window assembly as defined in claim 11, wherein said adhesive is a urethane adhesive.

16. A method of positioning a window pane in an automotive vehicle body, comprising the steps of:

adhesively securing at least one mounting strip to each of the window pane and the vehicle body in facing relationship;

applying an adhesive between the window pane and the vehicle body; and releasably interlocking said mounting strips.

17. The method as defined in claim 16, and further comprising curing said adhesive.

18. The method as defined in claim 17, and further comprising:

measuring the position of said window pane with respect to said vehicle body; and comparing said position to a desired position.

19. The method as defined in claim 18, and further comprising adjusting said position prior to said curing step in response to said comparing step, if said position differs from said desired position beyond a predetermined amount.

20. The method as defined in claim 18, wherein said comparing step comprises defining points on said window pane with light beams.

* * * * *